US006287533B1

(12) United States Patent
Khan et al.

(10) Patent No.: US 6,287,533 B1
(45) Date of Patent: Sep. 11, 2001

(54) PRODUCTION OF CHLORINE DIOXIDE BY CHEMICAL REDUCTION OF AMMONIUM CHLORATE IN AQUEOUS ACIDIC SOLUTION

(76) Inventors: Mohammed N. I. Khan, 1008 9th Ave., South, Clear Lake, IA (US) 50428; M. Fazlul Hoq, 1367 Boswall Dr., Worthington, OH (US) 43085

( * ) Notice: Subject to any disclaimer, the term of this patent is extended or adjusted under 35 U.S.C. 154(b) by 0 days.

(21) Appl. No.: 09/482,372

(22) Filed: Jan. 13, 2000

Related U.S. Application Data

(63) Continuation-in-part of application No. 60/154,860, filed on Sep. 20, 1999.

(51) Int. Cl.$^7$ .................................................. C01B 11/02
(52) U.S. Cl. ......................... 423/478; 423/479; 423/480
(58) Field of Search ..................... 423/478, 479, 423/480

(56) References Cited

U.S. PATENT DOCUMENTS

| 2,510,034 | * | 5/1950 | Haller ................................. 423/480 |
| 2,641,528 | * | 6/1953 | Audoynaud ........................ 423/478 |
| 4,081,515 | | 3/1978 | Gruhier et al. ..................... 423/351 |
| 4,978,517 | | 12/1990 | Norell et al. ....................... 423/479 |
| 5,091,166 | | 2/1992 | Engstrom et al. ................. 423/478 |
| 5,091,167 | | 2/1992 | Engstrom et al. ................. 423/478 |
| 5,093,097 | | 3/1992 | Engstrom et al. ................. 423/479 |
| 5,106,465 | | 4/1992 | Kaczur et al. ..................... 204/98 |
| 5,324,497 | | 6/1994 | Westerlund ........................ 423/478 |
| 5,380,517 | | 1/1995 | Sokol ................................. 423/478 |
| 5,486,344 | | 1/1996 | Winters et al. .................... 423/477 |
| 5,487,881 | | 1/1996 | Falgen et al. ...................... 423/478 |
| 5,523,072 | | 6/1996 | Falgen et al. ...................... 423/478 |
| 5,565,182 | | 10/1996 | Sokol ................................. 423/478 |
| 5,599,518 | * | 2/1997 | Kaczur et al. ..................... 423/478 |

OTHER PUBLICATIONS

Grant & Hackh's Chemical Dictionary, 5th edition, 1987, p. 33.*

* cited by examiner

Primary Examiner—Steven Bos
(74) Attorney, Agent, or Firm—Zarley, McKee, Thomte, Voorhees & Sease

(57) ABSTRACT

A novel method is described whereby chlorine dioxide is produced through the chemical reduction of ammonium chlorate in an aqueous acidic solution. The reduction reaction takes place at elevated temperatures with or without a catalyst. The reducing agent of this reaction is preferably hydrogen peroxide, glycerol, or sucrose. Chlorine dioxide may be produced in accordance with this invention at a substantially higher rate and in higher yield than with conventional methods using sodium chlorate. Further, the chlorine dioxide produced is substantially chloride-free. The ammonium sulfate by-product of this method has direct use as a fertilizer.

18 Claims, No Drawings

PRODUCTION OF CHLORINE DIOXIDE BY CHEMICAL REDUCTION OF AMMONIUM CHLORATE IN AQUEOUS ACIDIC SOLUTION

CROSS-REFERENCE TO RELATED APPLICATION

This application is a continuation-in-part of provisional application Ser. No. 60/154,860 filed Sep. 20, 1999.

FIELD OF THE INVENTION

This invention relates to the production of industrial chemicals. More specifically, the invention describes a novel process for producing chlorine dioxide through the reduction of ammonium chlorate in an aqueous acidic solution.

BACKGROUND OF THE INVENTION

Until recently, chlorine was used as a bleaching agent in the production of white pulp and paper. However, environmental protection agencies have prohibited the use of chlorine for pulp bleaching since it has been found to produce highly hazardous organochlorine compounds. Chlorine dioxide has replaced chlorine as the primary bleaching agent in the production of white pulp and paper. Chlorine dioxide is also used for water purification. It is now the most important worldwide commodity for these purposes.

Existing technologies for commercial production of chlorine dioxide involves the reduction of sodium chlorate/chloric acid with reducing agents such as hydrogen peroxide and glycerol, glycol (See e.g. U.S. Pat. Nos. 5,093,097; 5,091,166; 5,380,517; 5,486,344; and 5,487,881 and Japanese Pat. No. JP88-8203), methanol (U.S. Pat. Nos. 4,978,517 and 5,174,868) and chloride (U.S. Pat. No. 5,458,858; Canadian Pat. Nos. 461586 and 782574). The disclosures of these listed patents are hereby incorporated by reference. These commercial processes incorporate the following chemical reactions:

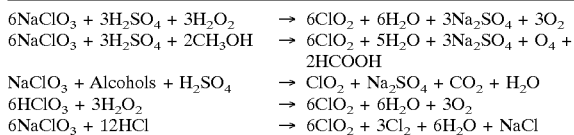

There are many drawbacks involved with the use of these existing technologies. For instance, methanol is a poisonous and volatile chemical. In addition, as shown above, the major oxidized product formed in methanol reduction processes is formic acid, which is also a toxic chemical. Thus, the use of methanol as a reducing agent in the production of chlorine dioxide creates an environmental hazard.

Chloride as a reducing agent is supplied either as hydrogen chloride or as sodium chloride. While chloride is not expensive, its use as a reducing agent in these processes is also disadvantageous since it makes chlorine dioxide with large amounts of chlorine impurity. This is problematic since there has traditionally been no practical means of disposing of chlorine waste material.

The use of methanol as a reducing agent in chlorine dioxide processes also has the disadvantage of producing the inevitable by-product sodium sulfate ($Na_2SO_4$), which is commercially known as salt cake. A part of the salt cake by-product is consumed by pulp mills to make sodium sulfide, a component of black liquor. However, the bulk of the salt cake does not have any use and must simply be disposed of.

Hydrogen peroxide can also be used as an efficient reducing agent in the production of chlorine dioxide. Although expensive, the use of hydrogen peroxide is an attractive alternative since it does not result in the formation of the formic acid and chlorine toxic by-products. However, the use of hydrogen peroxide also results in the production of large amounts of undesirable salt cake as a waste product.

There is therefore a need in the art for an improved method of producing chlorine dioxide.

It is therefore a primary objective of the present invention to provide a method of producing chlorine dioxide which does not form toxic by-products and is environmentally safe.

It is a further objective of the present invention to provide a means of producing chlorine dioxide in higher yield with a faster reaction rate than commercially known processes.

It is yet a further objective of the present invention to provide a means of producing chlorine dioxide which is economical.

It is a further objective of the present invention to provide a means of producing chlorine dioxide without the need for recycling the by-products.

These and other objectives will become apparent from the following description.

SUMMARY OF THE INVENTION

The present invention describes a method of producing chlorine dioxide using a novel chemical reaction. Specifically, the invention involves the chemical reduction of ammonium chlorate in an aqueous acidic solution. The reducing agent may include any one of hydrogen peroxide, sugars, alcohols, aldehydes, ketones, organic acids, sulfur dioxide, ammonium sulfite, ammonium bisulfite, or mixtures thereof. The reduction reaction is performed with or without a catalyst at elevated temperatures.

The yield of chlorine dioxide in this invention is over 110% on the basis of reducing agents than in existing processes, as well as at least a 50% higher rate. Further, the resulting chlorine dioxide is substantially free of chlorine impurity. Using sulfuric acid as the acidifying agent, ammonium sulfate is produced as a by-product which may be used as a fertilizer.

DETAILED DESCRIPTION OF THE PREFERRED EMBODIMENT

As set forth above, the present invention discloses the production of chlorine dioxide through the reduction of ammonium chlorate in an aqueous acidic solution, preferably in the absence of a substantial amount of sodium ions, meaning that there are insignificant amounts of sodium ions to produce salt cake by-product.

Any source of ammonium chlorate is suitable for this invention. The ammonium chlorate is preferably prepared by the double decomposition reaction of ammonium sulfate and barium chlorate, and most preferably as described in U.S. Pat. No. 5,948,380, the disclosure of which is hereby incorporated by reference. The concentration of chlorate ion ($ClO_3^-$) in the aqueous acidic solution is preferably maintained at about 0.5M to saturation, and most preferably between about 1.5M to 4.5M.

The source of acidity for this invention may be any strong acid, with sulfuric acid, ammonium bisulfite, chloric acid, perchloric acid, and mixtures thereof being preferred.

There are four preferred categories of aqueous acidic solutions for use in the invention. The first category is aqueous solutions of chloric acid or a mixture of chloric acid and ammonium chlorate with acidity ranging preferably from about 0.2N to 7N, and most preferably from about 1.5N to 5N. The chloric acid feed solution is available from the reaction of sulfuric acid with barium chlorate. The preparation of barium chlorate is described in U.S. Pat. No. 5,948,380.

The second preferred category of aqueous acidic solutions is aqueous solutions of perchloric acid or a mixture of perchloric acid and chloric acid or a mixture of perchloric acid and chloric acid, with acidity ranging preferably between about 0.2N to 1N, and most preferably between about 1.5N to 5N. The perchloric acid for making such mixtures is available commercially.

The third preferred category of aqueous acidic solutions is aqueous solutions of chloric acid and sulfuric acid, with acidity ranging preferably between about 1N to 14N, and most preferably between about 2N to 8N.

The fourth preferred category of aqueous acidic solutions is aqueous solutions of sulfuric acid and ammonium bisulfate and ammonium sulfate, with acidity ranging preferably between about 1N to 14N, and most preferably between about 2N to 8N. The source of aqueous acidity in these solution is sulfuric acid and ammonium bisulfate.

The concentrated aqueous solution of the reducing agent is fed into a reactor so as to maintain a concentration of reducing agent ranging from about 0.00005M to 0.88M in the reaction mixture. The preferred concentration of reducing agent is from about 0.005M to 0.4M, with the most preferred concentration being maintained in a range of from about 0.01M to 0.2M.

The reducing agent used in this invention is not critical, and may include any conventional reducing agents. These may include, but are not limited to hydrogen peroxide, sugars, alcohols, aldehydes, ketones, organic acids, sulfur dioxide, ammonium sulfite, ammonium bisulfite and mixtures thereof. Preferred sugars for use as a reducing agent in this invention are sucrose, glucose and fructose. Preferred alcohols are methanol, glycerol and ethylene glycol. Preferred acids are oxalic acid, malonic acid, citric acid, tartaric acid, and ascorbic acid. The most preferred reducing agents are hydrogen peroxide, glycerol, and sucrose.

The reduction of ammonium chlorate to chlorine dioxide by the reducing agents is carried out at a temperature ranging from about 20° C. to 100° C., preferably from about 45° C. to 85° C., and most preferably from about 55° C. to 80° C., and at a pressure ranging from about 50 to 800 mm of Hg, and preferably from about 65 to 500 mm of Hg.

Under the above reaction conditions, the reduction of ammonium chlorate in accordance with this invention proceeds smoothly at rates higher than with other industrially used processes using sodium chlorate in the absence of substantial amounts of chloride as a catalyst. As used herein, the phrase "in the absence of substantial amounts of chloride as a catalyst" means there are insufficient amounts of chloride present in the reduction reaction to function as a catalyst. Chloride may, however, be added to the reaction mixture as alkali or earth alkali metal chloride, in particular strontium chloride, hydrochloric acid, or ammonium chloride in an amount ranging from about 0.00001M to 0.6M to accelerate the rate of chlorine dioxide production by these reducing agents. A preferred concentration of chloride catalyst in the reaction is 0.0002M to 0.05M. The addition of ammonium chloride appears to accelerate chlorine dioxide production more than alkali metal chloride, and is therefore the most preferred catalyst. Reduction reactions of this invention may also be catalyzed by transition metal ions, with silver, cobalt, manganese, rare earth metals, or mixtures thereof being preferred. Other appropriate transition metal ions include manganese, cobalt, and strontium.

Under similar acidity, chlorate and sulfate concentrations, the rate of chlorine dioxide production in accordance with this invention is over 50% faster in a reaction mixture containing sulfuric acid, ammonium chlorate, and ammonium sulfate than in a mixture containing sulfuric acid, sodium chlorate and sodium sulfate.

The chemical combination of ammonium chlorate and the preferred reducing agents of this invention and a preferred aqueous acidic solution of sulfuric acid results in the following net reactions to produce chlorine dioxide, ammonium sulfate, nitrogen, and carbon dioxide:

$8NH_4ClO_3 + 3H_2SO_4 + H_2O_2 \rightarrow 3(NH_4)_2SO_4 + 8H_2O + O_2 + N_2 + 8ClO_2$ $33NH_4ClO_3 + C_{12}H_{22}O_{11} + 18H_2SO_4 \rightarrow 33ClO_2 + 32H_2O + 9(NH_4)_3H(SO_4)_2 + 12CO_2 + 3N_2$ sucrose $17NH_4ClO_3 + C_3H_9O_3 + 10H_2SO_4 \rightarrow 17ClO_2 + 16H_2O + 5(NH_4)_3H(SO_4)_2 + 3CO_2 + N_2$ glycerol $14NH_4ClO_3 + C_2H_6O_2 + 8H_2SO_4 \rightarrow 14ClO_2 + 13H_2O + 4(NH_4)_3H(SO_4)_2 + 2CO_2 + N_2$ ethylene glycol The major by-product, ammonium sulfate, may be used as a fertilizer or recycled by heating in the presence of a catalyst to produce useful industrial chemicals, such as sulfur dioxide and ammonia (U.S. Pat. No. 4,081,515). Thus, unlike the salt cake by-products of existing chlorine dioxide production processes, the ammonium sulfate by-product of the present invention does not require expensive disposal or reprocessing/recycling.

As shown above, the present inventors have discovered a way of preventing the production of the unwanted chlorine and sodium sulfate by-product generated by chlorine dioxide plants. This finding could potentially save the chemical industry large sums of money which would have otherwise been spent disposing of this waste product.

In addition, the methods of this invention using ammonium chlorate produces chlorine dioxide in a yield of 110% on the basis of reducing agent, and at a greater than 50% higher rate than in conventional processes using sodium chlorate, as demonstrated in Examples 2, 4, and 9 below.

The following examples are offered to illustrate but not limit the invention. Thus, they are presented with the understanding that various formulation modifications as well as reactor modifications may be made and still be within the spirit of the invention.

EXAMPLE 1

Preferred Method of Production of Chlorine Dioxide Using Hydrogen Peroxide as a Reducing Agent An aqueous solution of 304 g/h $NH_3ClO_3$ together with 150 g/h H2O2 of 30% solution was continuously added to a laboratory chlorine dioxide generator. $H_2SO_4$ of 50% concentration was added in order to keep the acid strength of 4.56N. An aqueous solution of 4.0 g $NH_4Cl$ was also added together with an excess of chlorate solution. The generator was run continuously at a temperature of around 70° C., and chlorine dioxide was collected under reduced pressure of 400 mm of Hg to keep the reaction mixture at boiling during the chlorine dioxide collection. A neutral salt $(NH_4)_2SO_4$ was crystallized in the crystallization region. The rate of chlorine dioxide production was 7.78 kg/l/d, with a yield of 99% and a rate of production of $8007 \times 10^{-5}$ moles/min/l reaction-mix.

EXAMPLE 2

Preferred Method of Production of Chlorine Dioxide Using Hydrogen Peroxide as a Reducing Agent in Acidic Solution Saturated with Ammonium Sulfate A mixture of 171 g/h $NH_4ClO_3$ and 51 g/h, $H_2O_2$ (30%) together with 3.6 g/h NaCl was continuously added to a chlorine production generator. $H_2SO_4$ was also fed to the reaction mixture to keep the acid strength of 4.0 N. The reaction mixture was saturated with $(NH_4)_2SO_4$. The generator was run continuously at temperature around 80° C., and chlorine dioxide was collected under reduced pressure of 250 mm of Hg in order to keep the reaction mixture at boiling during collection of $ClO_2$. A neutral salt $(NH_4)_2SO_4$ was crystallized in the crystallization region. Production of chlorine dioxide was 4.66 kg/l/d, and the yield was 99% with a rate of chlorine dioxide production of $4800 \times 10^{-5}$ moles/min/l reaction-mix.

This experiment was conducted in accordance with Example 3 of U.S. Pat. No. 5,091,166 to Engström, only substituting ammonium chlorate for the sodium chlorate. While Engström's rate of chlorine dioxide production was only 1.5 kg/l/day, as shown above, Applicant was able to achieve a rate of 5.25 kg/l/day, or a rate 3.1 times higher than that of Engström.

EXAMPLE 3

Preferred Method of Production of Chlorine Dioxide Using Hydrogen Peroxide as a Reducing Agent An aqueous solution of 134 g/h $NH_4ClO_3$ together with 60 g/h $H_2O_2$ (30% solution) was continuously added to a laboratory chlorine dioxide production generator. A required amount of $H_2SO_4$ was also fed to the reaction mixture to keep the acid strength of 4.0 N. An aqueous solution of 1.96 g/h NaCl was added together with excess $NH_4ClO_3$ solution. The generator was run continuously at temperature around 70° C., and chlorine dioxide was collected under reduced pressure of 150 mm of Hg in order to keep the reaction mixture at boiling during collection of $ClO_2$. A neutral salt $(NH_4)_2SO_4$ was crystallized in the crystallization region. Production of chlorine dioxide was 3.62 kg/l/d, and the yield was 95% with a rate of chlorine dioxide production of $3628 \times 10^{-5}$ moles/min/l reaction-mix.

EXAMPLE 4

Preferred Method of Production of Chlorine Dioxide Using Hydrogen Peroxide as a Reducing Agent A mixture of 172 g/h $NH_4ClO_3$ together with 77 g/h $H_2O_2$ (30% solution) was continuously added to a laboratory chlorine dioxide production generator. A required amount of $H_2SO_4$ was also fed to the reaction mixture to keep the acid strength of 4.0 N. An aqueous solution excess of $NH_4ClO_3$ together with 3.25 g/h NaCl was added to the generator. The reaction mixture in the generator was kept at boiling throughout the collection of $ClO_2$, and chlorine dioxide was collected at 70° C. under reduced pressure of 150 mm of Hg. A neutral salt $(NH_4)_2SO_4$ was crystallized in the crystallization region. Production of chlorine dioxide was 4.10 kg/l/d, and the yield was 98% with a rate of chlorine dioxide production of $4218 \times 10^{-5}$ moles/min/l reaction-mix.

This experiment was conducted in accordance with Example 1 of U.S. Pat. No. 5,091,166 to Engström, only substituting ammonium chlorate for the sodium chlorate. While Engström's rate of chlorine dioxide production was only 1.2 kg/l/day, as shown above, Applicant was able to achieve a rate of 4.10 kg/l/day, or a rate 3.4 times higher than that of Engström.

EXAMPLE 5

Preferred Method of Production of Chlorine Dioxide Using Hydrogen Peroxide as a Reducing Agent in Acidic Solution Saturated with Amimonium Sulfate A mixture of 173 g/h $NH_4ClO_3$ together with 51 g/h $H_2O_2$ (30% solution) was continuously added to a laboratory chlorine dioxide production generator. A required amount of $H_2SO_4$ was also fed to the reaction mixture to keep the acid strength of 4.0 N. An aqueous solution excess of $NH_4ClO_3$ together with 3.2 g/h $NH_4Cl$ was added to the generator. The reaction mixture was saturated with $(NH_4)_2SO_4$. The generator was continuous run at a temperature of around 80° C. Chlorine dioxide was collected under reduced pressure of 250 mm of Hg while keeping the reaction mixture at boiling. A neutral salt $(NH_4)_2SO_4$ was crystallized in the crystallization region. Production of chlorine dioxide was 5.25 kg/l/d, and the yield was 99% with a rate of chlorine dioxide production of $5400 \times 10^{-5}$ moles/min/l reaction-mix.

EXAMPLE 6

Preferred Method of Production of Chlorine Dioxide Using Sugar as a Reducing Agent A water solution of 225 g/h $NH_4ClO_3$ together with 60 g/h sugar (50% aqueous solution) were added continuously to a laboratory reactor. A required amount of $H_2SO_4$ (50% solution) was also added to keep the acidity 7N. The reactor was run continuously at temperature around 65° C., and chlorine dioxide was collected under reduced pressure 250 mm of Hg in order to keep the reaction mixture boiling during the collection of chlorine dioxide. The crystals of $(NH_4)_3H(SO_4)_2$ were isolated in the crystal region. The chlorine dioxide production was 4.70 kg/l/d, and yield was 95% with a rate of production of $4837 \times 10^{-5}$ moles/min/l reaction mix.

EXAMPLE 7

Preferred Method of Production of Chlorine Dioxide Using Sugar as a Reducing Agent 7A—$NH_1ClO_3$/Sugar System To a chlorine dioxide production generator, a aqueous solution of 255 g/h $NH_4ClO_3$ and 60 g/h sugar (50% aqueous solution) were added continuously. A 50% solution of $H_2SO_4$ was also added to keep the aqueous acidity at 8N. The generator was run continuously at a temperature of around 70° C. while chlorine dioxide was collected under reduced pressure of 250 mm of Hg. Reduced pressure was maintained in order to keep the reaction mixture at boiling. The crystals of $(NH_4)_3H(SO_4)_2$ were isolated in the crystal region. The chlorine dioxide production was 12.50 kg/l/d, and the yield was 99% with a rate of production $12869 \times 10^{-5}$ moles/min/l reaction mix.

7B—NaClO₃/Sugar System 319 g/h $NaClO_3$ and 60 g/h sugar (50% solution) was added to a chlorine dioxide production generator. A required amount of $H_2SO_4$ was also added to keep acid at 8.0N. The generator was continuously run at 70° C., and chlorine dioxide was continuously collected under reduced pressure of 250 mm of Hg. The production of chlorine dioxide was 7.78 kg/l/d and at a rate of $8000 \times 10^{-5}$ moles/l/min.

Thus, as shown above, the production of chlorine dioxide was much more efficient using Applicant's method using ammonium chlorate than the previous method using sodium chlorate.

EXAMPLE 8

Preferred Method of Production of Chlorine Dioxide Using Sugar as a Reducing Agent A water solution of 170 g/h $NH_4ClO_3$ and 50 g/h sugar (50% aqueous solution) were continuously added to a chlorine production generator at temperature around 80° C. 50% aqueous $H_2SO_4$ was added to keep the acid concentration at 8N. The generator was run continuously at a temperature of around 80° C. during which time chlorine dioxide was collected under reduced pressure of 150 mm of Hg. The crystals of $(NH_4)_3H(So_4)_2$ were isolated in the crystal region. The chlorine dioxide production was 24.50 kg/l/d, and the yield was 99% with a production rate of $25185 \times 10^{-5}$ moles/min/l reaction mix.

EXAMPLE 9

Preferred Method of Production of Chlorine Dioxide Using Glycerol as a Reducing Agent 255 g/h $NH_4ClO_3$ aqueous solution and 30 g/h glycerol (50% aqueous solution) were added continuously to a laboratory chlorine dioxide generator. A $H_2SO_4$/50% aqueous solution was also added to maintain the acidity of the reaction mixture at 7N. The reactor was run continuously at around 70° C. while chlorine dioxide was collected under reduced pressure at 250 mm of Hg. The crystals of $(NH_4)_3H(SO_4)_2$ were isolated in the crystal region. The chlorine dioxide production was 8.60 kg/l/d, and the yield was 99% with a rate of production $8848 \times 10^{-5}$ moles/min/l reaction mix.

This experiment was conducted in accordance with Example 3 of U.S. Pat. No. 5,093,097 to Engström, only substituting ammonium chlorate for the sodium chlorate. While Engström's rate of chlorine dioxide production was only 1.7 kg/l/day, as shown above, Applicant was able to achieve a rate of 8.60 kg/l/day, or a rate over 5 times hither than that of Engström.

EXAMPLE 10

Preferred Method of Production of Chlorine Dioxide Using Ethylene Glycol as a Reducing Agent To a laboratory chlorine dioxide generator an aqueous solution of 170 g/h $NH_4ClO_3$ and 30 g/h ethylene glycol (20% aqueous solution) were added continuously. 50% aqueous $H_2SO_4$ solution was added to keep the acidity at 7N. The generator was run continuously at around 65° C. during which time chlorine dioxide was collected at a reduced pressure 350 mm of Hg. Reduced pressure was applied to keep the reaction mixture at boiling. The crystals of $(NH_4)_3H(SO_4)_2$ were isolated in the crystal region. The chlorine dioxide production was 8.75 kg/l/d, and the yield 99% with a rate of production $8992 \times 10^{-5}$ moles/min/l reaction mix.

EXAMPLE 11

Determination of Rates of Chlorine Dioxide Production in Flow Reactor

The rate determination experiments were carried out as described in Examples 1–5. The rates were calculated based on the amount of chlorine dioxide collected, time of collection and the volume of the reaction mixtures. The rates and reaction conditions are given in Table 1 below:

TABLE 1

Results of Flow Reactor Experiments from Hydrogen Peroxide Reduction

| Example Numbers | Amount of $ClO_2$ in g/l/min | Pressure in mm of Hg | Catalyst | Catalyst Molarity | Temp., °C. | Molarity of Chlorate ion | Normality of $H_2SO_4$ | $ClO_2$ rate moles/min./lit. |
|---|---|---|---|---|---|---|---|---|
| 1 | 7.78 | 400 | $NH_4Cl$ | 0.0010 | 70 | 2.00 | 4.56 | $8007 \times 10^{-5}$ |
| 2 | 4.66 | 250 | NaCl | 0.00045 | 80 | 2.00 | 4.00 | $4800 \times 10^{-5}$ |
| 3 | 3.62 | 150 | NaCl | 0.00136 | 70 | 2.00 | 4.00 | $3628 \times 10^{-5}$ |
| 4 | 4.10 | 150 | $NH_4Cl$ | 0.00056 | 70 | 2.00 | 4.00 | $4218 \times 10^{-5}$ |
| 5 | 5.25 | 250 | $NH_4Cl$ | 0.00049 | 80 | 2.00 | 4.00 | $5400 \times 10^{-5}$ |

Examples 2 and 5 were carried out in a reaction mixture saturated with ammonium sulfate.

EXAMPLE 12

Determination of Rates of Chlorine Dioxide Production in Flow Reactor

The rate determination experiments were carried out as described in Examples 6–10. The rates were calculated based on the amount of chlorine dioxide collected, time of collection and the volume of the reaction mixtures. The rates and reaction conditions are given in Table 2 below:

TABLE 2

Results of Flow Reactor Experiments from Sugar, Glycerol and Ethylene Glycol

| Reducing Agents | Amount of ClO$_2$ in g/l/min | Pressure in mm of Hg | Temp., °C. | Molarity of reducing agents | Molarity of NH$_4$ClO$_3$ | Normality of H$_2$SO$_4$ | ClO$_2$ rate moles/min./lit. |
|---|---|---|---|---|---|---|---|
| Sugar | 4.70 | 250 | 65 | 0.058 | 2.0 | 7 | 4837 × 10$^{-5}$ |
|  | 12.50 | 250 | 70 | 0.058 | 2.0 | 8 | 12869 × 10$^{-5}$ |
|  | 24.50 | 150 | 80 | 0.073 | 2.0 | 8 | 25185 × 10$^{-5}$ |
| Glycerol | 8.60 | 250 | 70 | 0.197 | 2.0 | 7 | 8848 × 10$^{-5}$ |
| Ethylene Glycol | 8.75 | 350 | 65 | 0.322 | 2.0 | 7 | 8992 × 10$^{-5}$ |

It is therefore submitted that the present invention accomplishes at least all of its stated objectives.

What is claimed is:

1. A method of producing chlorine dioxide comprising:
reacting ammonium chlorate with a reducing agent in an aqueous acidic solution.

2. A method according to claim 1 wherein the reducing agent is selected from the group consisting of hydrogen peroxide, sugars, alcohols, aldehydes, ketones, organic acids, sulfur dioxide, ammonium sulfite, ammonium bisulfite, and mixtures thereof.

3. A method according to claim 2 wherein the sugar is selected from the group consisting of glucose, fructose and sucrose.

4. A method according to claim 2 wherein the alcohol is selected from the group consisting of methanol, glycerol and ethylene glycol.

5. A method according to claim 2 wherein the organic acid is selected from the group consisting of oxalic acid, malonic acid, citric acid, tartaric acid, and ascorbic acid.

6. A method according to claim 1 wherein the reaction takes place at a temperature of between about 200° C. to 100° C.

7. A method according to claim 6 wherein the reaction takes place at a temperature of between about 45° C. to 85° C.

8. A method according to claim 1 wherein the aqueous acidic solution comprises an acid selected from the group consisting of sulfuric acid, ammonium bisulfate, chloric acid, perchloric acid, and mixtures thereof.

9. A method according to claim 8 wherein the aqueous acidic solution has an acidity ranging from about 0.5N to 9N, and is selected from the group consisting of an aqueous solution of chloric acid and a mixture of chloric acid and ammonium chlorate.

10. A method according to claim 8 wherein the aqueous acidic solution has an acidity ranging from about 0.5N to 10N, and is selected from the group consisting of an aqueous solution of perchloric acid, a mixture of perchloric acid and ammonium chlorate, and a mixture of perchloric acid, chloric acid, and ammonium chlorate.

11. A method according to claim 8 wherein the aqueous acidic solution has an acidity ranging from about 1N to 14N, and is selected from the group consisting of a mixture of chloric acid and sulfuric acid, and a mixture of choloric acid, sulfuric acid, and ammonium chlorate.

12. A method according to claim 8 wherein the aqueous acidic solution is a mixture of ammonium chlorate, sulfuric acid, ammonium bisulfate and ammonium sulfate having an acidity ranging from about 1N to 14N.

13. A method according to claim 8 wherein the concentration of ammonium sulfate in the aqueous acidic solution is from about 0.5M to saturation.

14. A method according to claim 1 wherein the concentration of reducing agent in the aqueous acidic solution is from about 0.00005M to about 0.88M.

15. A method according to claim 1 wherein the concentration of ammonium cholorate in aqueous acidic solution is from 0.5M to saturation.

16. A method according to claim 1 wherein the reaction is conducted at a pressure of between about 50 mm to about 800 mm of Hg.

17. A method according to claim 1 wherein a catalyst is added to the aqueous acidic solution during the reacting step.

18. A method according to claim 17 wherein a chloride ion or transition metal catalyst is added to the aqueous acidic solution during the reacting step.

* * * * *

UNITED STATES PATENT AND TRADEMARK OFFICE
CERTIFICATE OF CORRECTION

PATENT NO. : 6,287,533 B1
DATED : September 11, 2001
INVENTOR(S) : Mohammed N.I. Khan and M. Fazlul Hoq Page 1 of 1

It is certified that error appears in the above-identified patent and that said Letters Patent is hereby corrected as shown below:

<u>Column 3,</u>
Line 15, "0.2N to 1.0N" should read -- 0.2N to 10N --.

<u>Column 9,</u>
Line 37-38, "200° C. to 100° C." should read -- 20° C. to 100° C. --.

Signed and Sealed this

Thirtieth Day of April, 2002

Attest:

JAMES E. ROGAN
*Director of the United States Patent and Trademark Office*

*Attesting Officer*